(12) United States Patent
Ishii et al.

(10) Patent No.: US 6,175,739 B1
(45) Date of Patent: Jan. 16, 2001

(54) CHANNEL SELECTION METHOD OF A WIRELESS COMMUNICATION SYSTEM

(75) Inventors: Kenichi Ishii; Tomoki Osawa, both of Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/123,874

(22) Filed: Jul. 28, 1998

(30) Foreign Application Priority Data

Jul. 10, 1997 (JP) .................................................. 9-204524

(51) Int. Cl.[7] .................................................. H04B 7/00
(52) U.S. Cl. ........................... 455/452; 455/453; 455/62; 455/509
(58) Field of Search .................... 455/422, 450, 455/452, 453, 62, 464, 465, 67.1, 423, 424, 509.511; 370/341, 431, 432, 437

(56) References Cited

U.S. PATENT DOCUMENTS

| | | | |
|---|---|---|---|
| 5,749,055 | * | 5/1998 | Dahlin .................................. 455/453 |
| 5,812,952 | * | 9/1998 | On et al. ............................. 455/452 |
| 6,041,239 | * | 3/2000 | Reed et al. .......................... 455/453 |

OTHER PUBLICATIONS

"Wireless LAN Medium Access Control and Physical Layer Specifications", Draft Standard IEEE 802.11, P802.11D2.O, (Jul. 1995).

"A Propsal of Packet DCA for a Wireless LAN System", by Ishii et al., B–652, p. 136, Proceedings of the Communication Society Congress 1996, IEICE.

* cited by examiner

Primary Examiner—Thanh Cong Le
(74) Attorney, Agent, or Firm—Ostrolenk, Faber, Gerb & Soffen, LLP

(57) ABSTRACT

To provide a channel selection method of a wireless communication system which enables a wireless station to select a wireless channel dynamically even when there are but an insufficient number of wireless channels, a channel selection method of selecting a wireless channel from a plurality of wireless channels prepared for the wireless communication system comprises: a channel search step (202) of checking whether any one of the plurality of wireless channels is left unused by other wireless stations of the wireless communication system or not; a sharing channel selection step (207) of selecting a wireless channel to be shared from wireless channels under use of the other wireless stations, said sharing channel selection step being performed when every of the plurality of wireless channels is found (205) to be under use of one of the other wireless stations at the channel search step; and a link establishment step of establishing the wireless link by sharing the wireless channel selected at the sharing channel selection step.

18 Claims, 10 Drawing Sheets

CHANNEL SELECTION METHOD OF A WIRELESS COMMUNICATION SYSTEM

BACKGROUND OF THE INVENTION

The present invention relates to a channel selection method to be applied to a wireless communication system wherein a plurality of wireless channels are used by a plurality of wireless stations, each selected dynamically according to usage of the wireless channels checked by each of the wireless stations, and particularly relates to the channel selection method which enables a dynamic and appropriate channel selection even when but few available wireless channels are left to be selected.

In conventional connection-less wireless communication systems to be applied to a wireless LAN (Local Area Network), for example, such as described in "Wireless LAN Medium Access Control and Physical Layer Specifications", Draft Standard IEEE 802.11, P802.11D2.0, (July 1995), (hereafter called the first prior document), a wireless channel is commonly used by a base station connected to a wired network and one or more mobile stations connected with the base station for configuring a wireless link of a wireless communication system, and a wireless channel is fixedly assigned to each base station considering propagation characteristics and the traffic prediction of each base station. The mobile station designates a wireless channel assigned to a base station of a zone where the mobile station actually exists, manually or according to a control signal which is periodically or continuously transmitted from the base station.

However, when the wireless channels are assigned fixedly for each of the base stations according to the propagation characteristics and the traffic prediction, there may occur interferences between base stations whereto the same wireless channel is assigned, if the actual propagation characteristics or the actual communication traffic is changed from the prediction.

For dealing with this problem, we proposed a dynamic channel selection method in a paper entitled "A Proposal of Packet DCA for a Wireless LAN System", B-652, p. 136, Proceedings of the Communication Society Congress 1996, IEICE, (hereafter called the second prior document), wherein an appropriate channel selection according to actual propagation characteristics and communication traffic is realized by enabling a wireless station to select a wireless channel not used by other wireless stations dynamically and independently, for establishing a new wireless link.

However, the channel selection method proposed in the second prior document is based on an assumption that a sufficient number of wireless channels are prepared so that there are always left some channels not used by other wireless stations and available for the new wireless link to be established, and there is no description concerning the case where no available channel is left unused. Therefore, there may arise wireless links whereto any wireless channel can be assigned, when the number of available wireless channels is insufficient.

SUMMARY OF THE INVENTION

Therefore, a primary object of the present invention is to provide a channel selection method of a wireless communication system which enables a wireless station to select a wireless channel dynamically even when there are but an insufficient number of wireless channels, by resolving above problem of the dynamic channel allocation.

In order to achieve the object, a channel selection method of the invention for establishing a wireless link of a wireless communication system by dynamically selecting a wireless channel to be used for the wireless link from a plurality of wireless channels prepared for the wireless communication system comprises:

a channel search step of checking whether any one of the plurality of wireless channels is left unused by other wireless stations of the wireless communication system or not;

a sharing channel selection step of selecting a wireless channel to be shared from wireless channels under use of the other wireless stations, said sharing channel selection step being performed when every of the plurality of wireless channels is found to be under use of one of the other wireless stations at the channel search step; and a link establishment step of establishing the wireless link by sharing the wireless channel selected at the sharing channel selection step.

Therefore, the wireless station can establish the new wireless link even when no wireless channel is left unused, by designating a wireless channel to be shared dynamically from wireless channels under use of other base stations, enabling at the same time to improve efficiency of channel resources of the wireless communication system.

Furthermore, the link establishment step comprises a step of registering sharing information of the wireless channel to be shared in a sharing information register provided in the wireless station, and the wireless station reports the sharing information to a sharing wireless station which is using the same wireless channel whereof the sharing information is registered in the sharing information register of the wireless station by way of the same wireless channel, periodically during the sharing information is registered. The wireless station also registers the sharing information in the sharing information register thereof when the sharing information is reported from another wireless station of the wireless communication system.

Therefore, both the wireless station and the sharing wireless station can always confirm sharing status of their using wireless channel by exchanging the sharing report with each other periodically, and so, they can recognize release of the sharing status for clearing the sharing information by counting a number of the sharing reports received in a certain time interval.

Furthermore, the wireless station clears the sharing information registered in the sharing information register thereof when the sharing report is not received from any other wireless station of the wireless communication system during a predetermined time period, and the wireless station switches the wireless channel used for the wireless link into an unused one of the wireless channels when the unused one is found by performing the channel search step periodically during the sharing information is registered in the sharing information register thereof.

Therefore, sharing of a wireless channel can be minimized dynamically in accordance with communication traffic in the wireless communication system according to the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
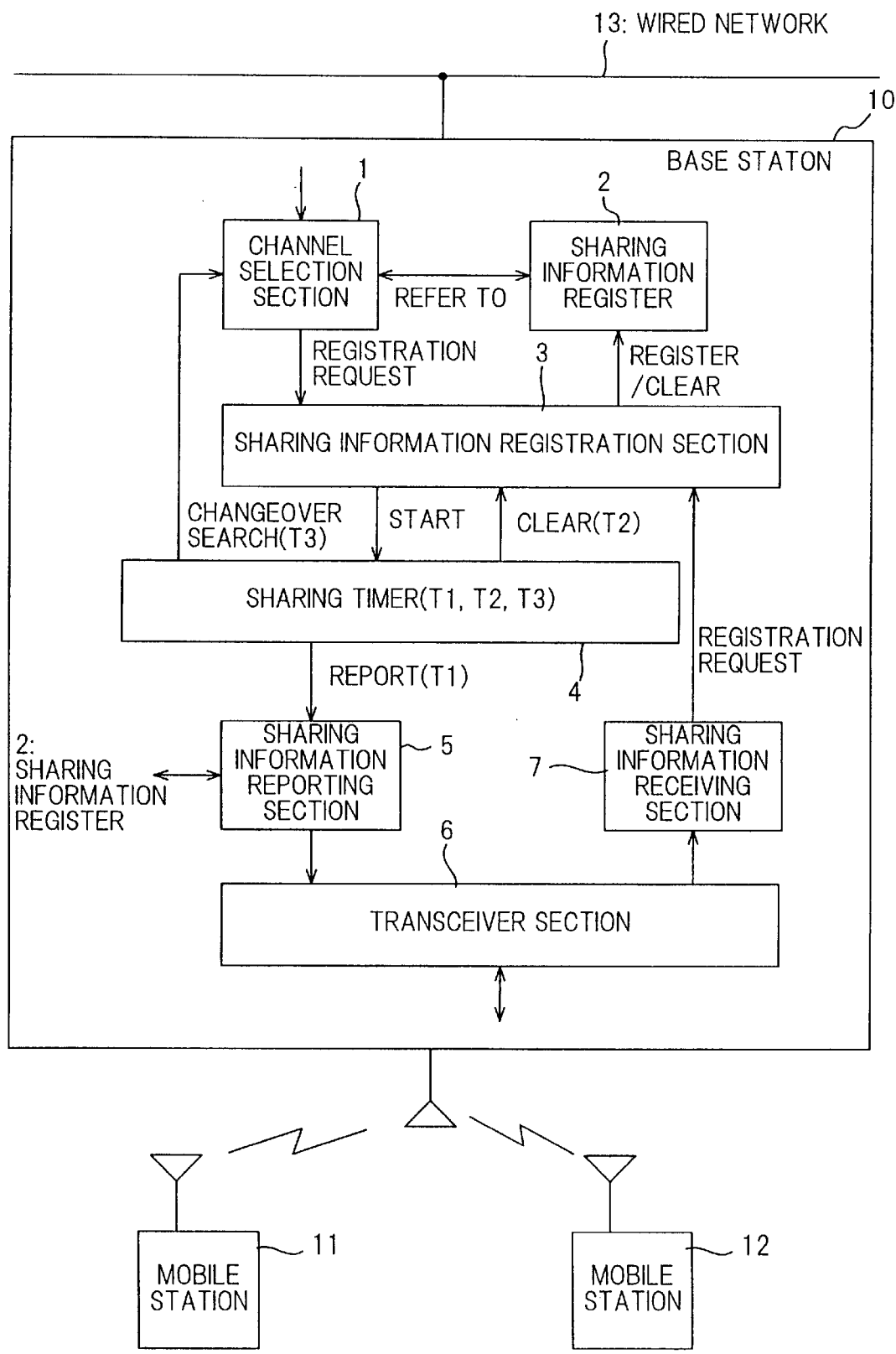
FIG. 1 is a block diagram illustrating a functional configuration of a wireless communication system whereto embodiments of the invention are to be applied.
Figure 13:
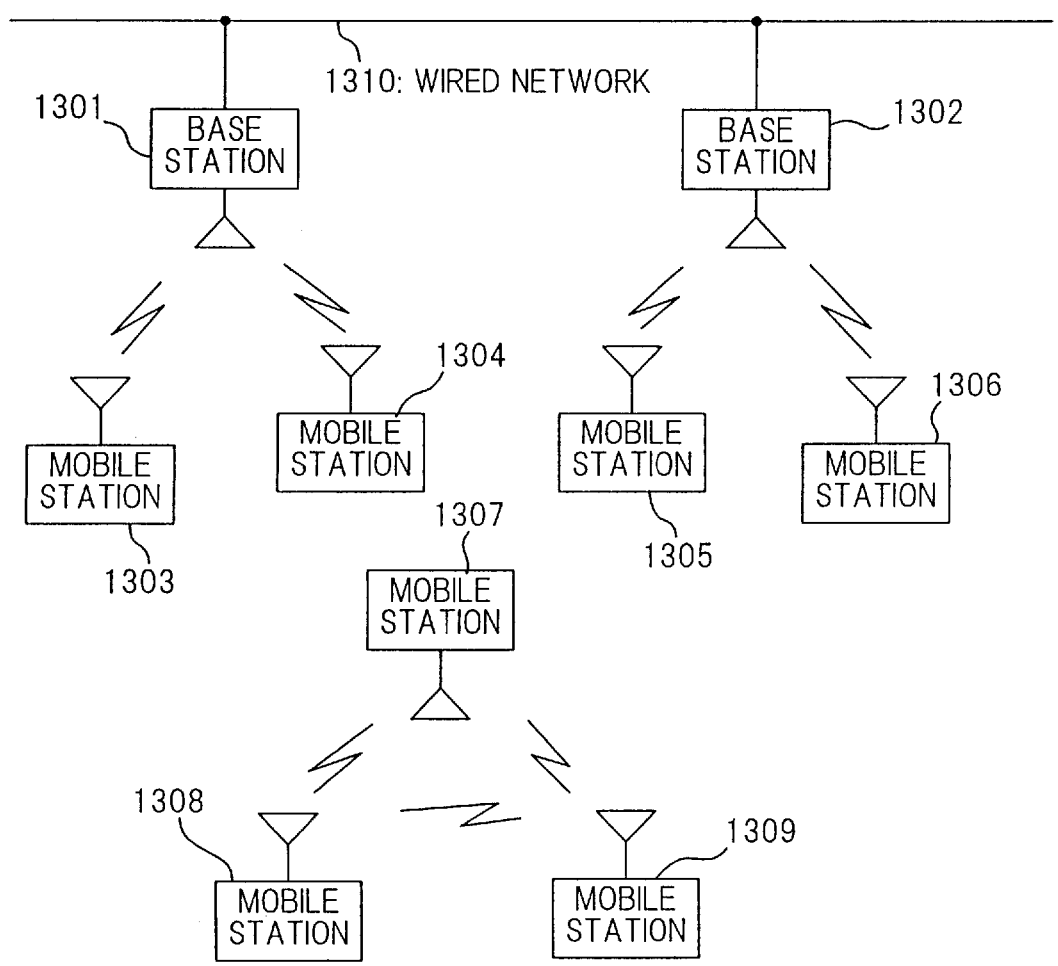
FIG. 13 is a schematic diagram illustrating another example of the network configuration of the wireless communication system.

FIG. 1 is a block diagram illustrating a functional configuration of a wireless communication system whereto embodiments of the invention are to be applied. In the wireless communication system of FIG. 1, a base station 10 connected to a wired network 13 and a plurality of mobile stations 11, 12 connected to the base station 10 through a wireless link are communicating with each other, making use of a single wireless channel Ch1, for example. A plurality of base stations having a similar configuration are connected to the wired network 13, in the same way as illustrated in FIG. 13, each thereof establishing its own wireless link for performing wireless communication making use of one of available wireless channels, such as a wireless channel Ch2 or Ch3.

Referring to FIG. 1, the base station 10 comprises a channel selecting section 1, a sharing information register 2, a sharing information registration section 3, a sharing timer 4, a sharing information reporting section 5, a transceiver section 6 and a sharing information receiving section 7.

The characteristic of the invention lies in that the base station 10 shares a wireless channel which is selected from wireless channels already used by other base stations, when there is left no unused wireless channel.

The channel selection section 1 searches an available wireless channel when a new wireless link is to be established by the base station 10. However, it designates a wireless channel actually used by another base station as a wireless channel to be shared when no unused wireless channel is found, and requests the sharing information registration section 3 to register sharing information of the shared wireless channel. The channel selection section 1 also takes charge of searching again an available wireless channel when a changeover search indication is received from the sharing timer 4, for switching the shared wireless channel under use into an unused wireless channel, whereof details will be described afterwards in connection with flowcharts.

The sharing information register 2 stores sharing information concerning the shared wireless channel. The shared wireless channel may be a wireless channel which is under use of the base station 10 and decided to be shared by another base station, as well as the wireless channel which the base station 10 itself decides to share. The sharing information of the shared wireless channel is reported by way of a sharing report transmitted from the base station to another base station using the shared wireless channel, periodically during when the sharing information is registered.

The sharing information registration section 3 registers the sharing information of the shared wireless channel in the sharing information register 2 when a registration request is received from the channel selection section 1 or the sharing information receiving section 7, and at the same time, starts the sharing timer 4. The sharing information registration section 3 also takes charge of clearing the sharing information of the shared wireless channel registered in the sharing information register 2 referring a report counter according to a clearance indication received from the sharing timer 4, whereof details will be described afterwards referring to flowcharts.

The sharing timer 4, having a first, a second and a third counter each counting each of a first, a second and a third time interval T1, T2 and T3, begins to count when the sharing timer 4 is started by the sharing information registration section 3. The sharing timer 4 transmits a report indication to the sharing information reporting section 5 every time when the first counter counts the first time interval T1, the clearance indication to the sharing information registration section 3 when the second counter counts the second time interval T2, and the changeover search indication to the channel selection section 1 when the third counter counts the third time interval T3. The second time interval T2 has a value larger than the first time interval T1, while the third time interval T3 has a value independent of either of the first and the second time interval T1 and T2, whereof details will be described afterwards referring to flowcharts.

Receiving the report indication from the sharing timer 4, the sharing information reporting section 5 transmits the sharing report concerning the shared wireless channel through the transceiver section 6 to another base station which is using the shared wireless channel (hereafter the base station which is sharing the same wireless channel with the base station 10 is called the sharing base station, regardless of which base station begins to share the wireless channel).

On the other hand, the sharing information receiving section 7 requests registration of the sharing information to the sharing information registration section 3 when the sharing report is received through the transceiver section 6 from the sharing station.

Figure 2:
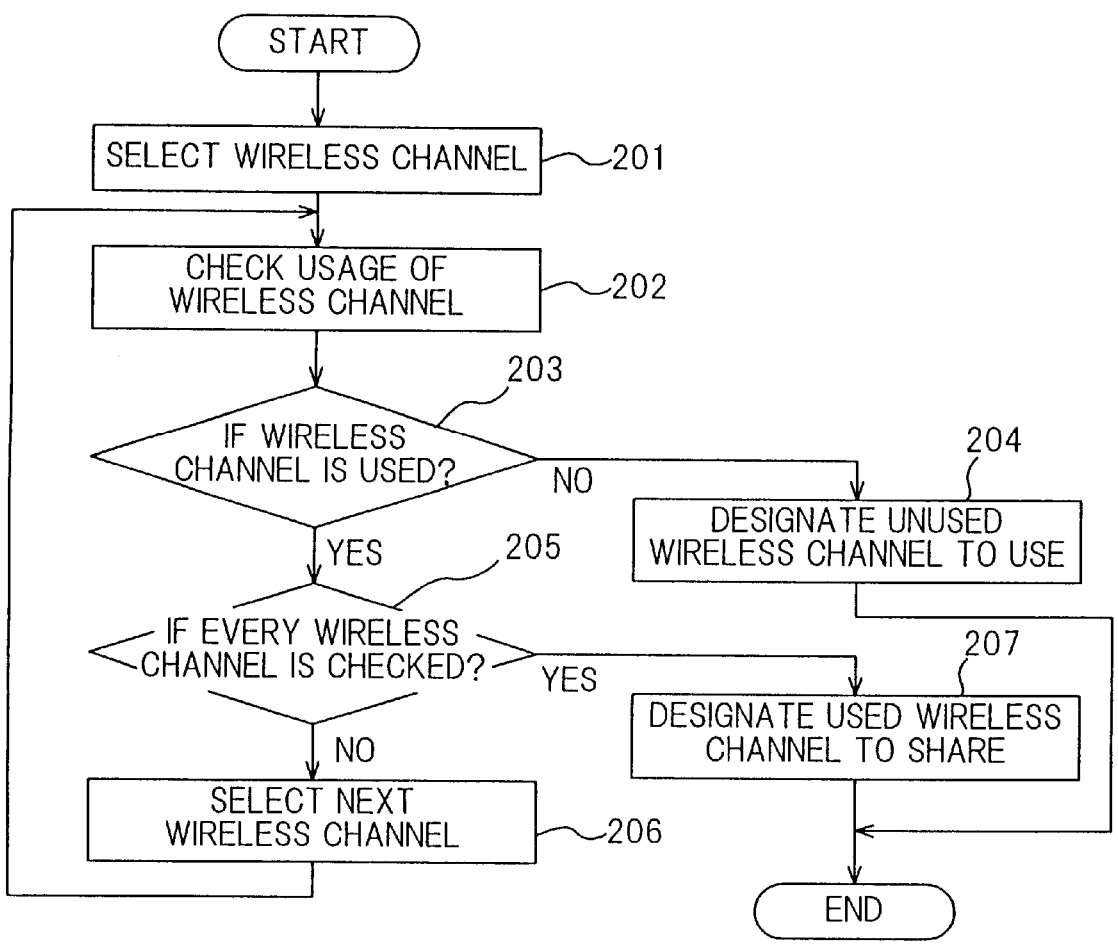
FIG. 2 is a flowchart illustrating a channel selection procedure according to a first embodiment of the invention.

Now, operation of a first embodiment is described referring to the block diagram of FIG. 1 and the flowchart of FIG. 2.

For establishing a new wireless link, the base station 10 must designate a wireless channel to be used, and so, searches a wireless channel not used by other base stations, for the first.

For the purpose, a channel selection procedure of FIG. 2 is started, wherein the channel selection section 1 selects a wireless channel from wireless channels to be checked (at step 201), and checks whether the concerning wireless channel is used or not (at step 202). When the concerning wireless channel is found not used by any other base station (NO at step 203), the concerning wireless channel is designated as the wireless channel to be used (at step 204) and the channel selection procedure goes to END.

When the concerning wireless channel is used by another base station (YES at step 203), the channel selection section 1 selects a next wireless channel (at step 206) and the procedure returns to step 202 for checking whether the next wireless channel is used or not. Thus, steps 202 to 206 are repeated until an unused wireless channel is found (NO at step 203) or every of the wireless channels is checked (YES at step 205).

When every of the wireless channels is checked (YES at step 205), it means that no wireless channel is left unused. In the case, the channel selection section 1 designates a wireless channel selected from wireless channels used by other base stations as the wireless channel to be shared (at step 207), and the channel selection procedure is terminated.

Thus, the base station begins a connection-less communication by way of the shared wireless channel, making use of wireless packets having header information including an ID (IDentifier) of the wireless link newly established, for example, in such a way as described in the first prior document previously mentioned.

Figure 3:
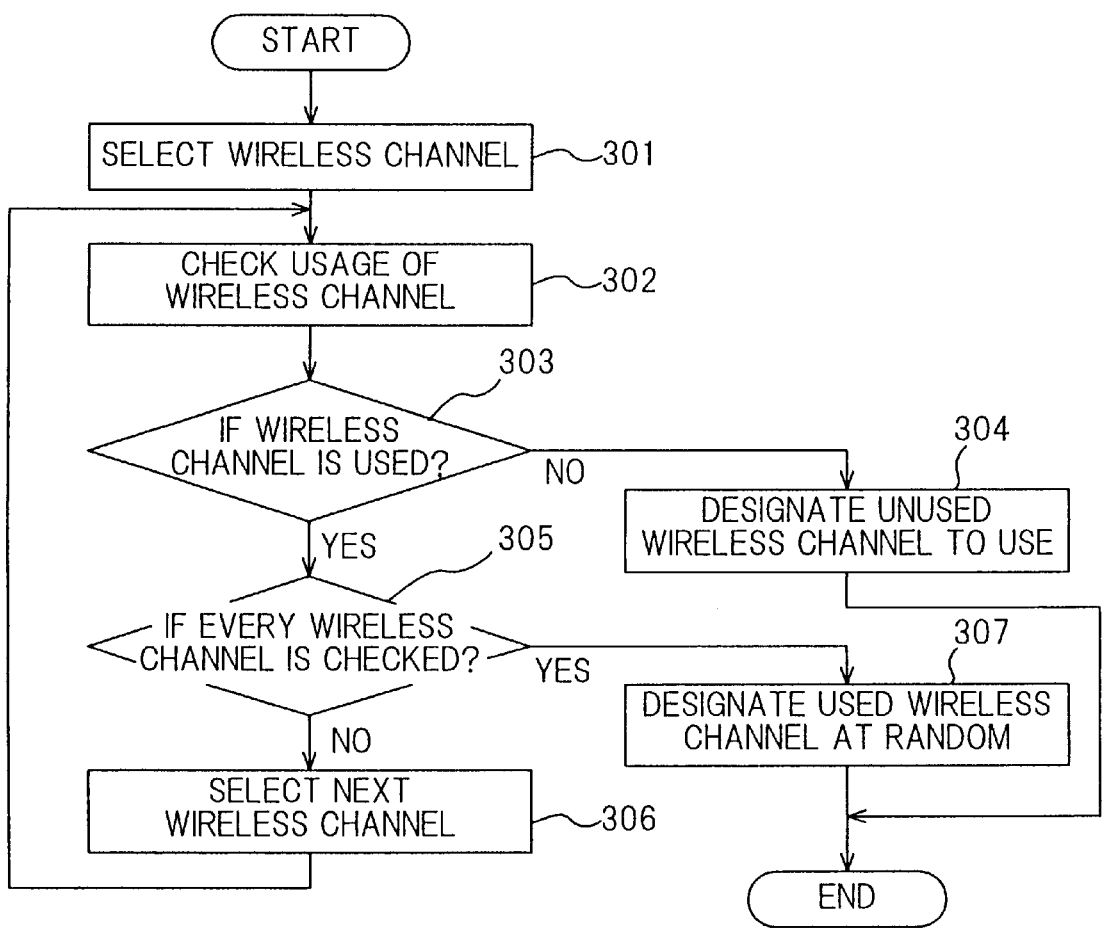
FIG. 3 is a flowchart illustrating another channel selection procedure according to a second embodiment of the invention.

Now, a second embodiment of the invention is described referring to a flowchart of FIG. 3 illustrating another channel selection procedure, wherein the designation of the shared wireless channel at step 207 of FIG. 2 is performed by selecting a used wireless channel at random. In the flowchart of FIG. 3, the same processes are performed with the flowchart of FIG. 2 except for step 207.

The channel selection section 1 selects a wireless channel from wireless channels to be checked (at step 301), and checks whether the concerning wireless channel is used or not (at step 302). When the concerning wireless channel is found not used by any other base station (NO at step 303), the concerning wireless channel is designated as the wireless channel to be used (at step 304) and the procedure goes to END.

When the concerning wireless channel is used by another base station (YES at step 303), the channel selection section 1 selects a next wireless channel (at step 306) and the procedure returns to step 302 for checking whether the next wireless channel is used or not. Thus, steps 302 to 306 are repeated until an unused wireless channel is found (NO at step 303) or every of the wireless channels is checked (YES at step 305).

When every of the wireless channels is checked (YES at step 305), it means that no wireless channel is left unused. In the case, the channel selection section 1 designates a wireless channel selected at random from wireless channels used by other base stations as the wireless channel to be shared (at step 307), and the procedure is terminated.

Figure 4:
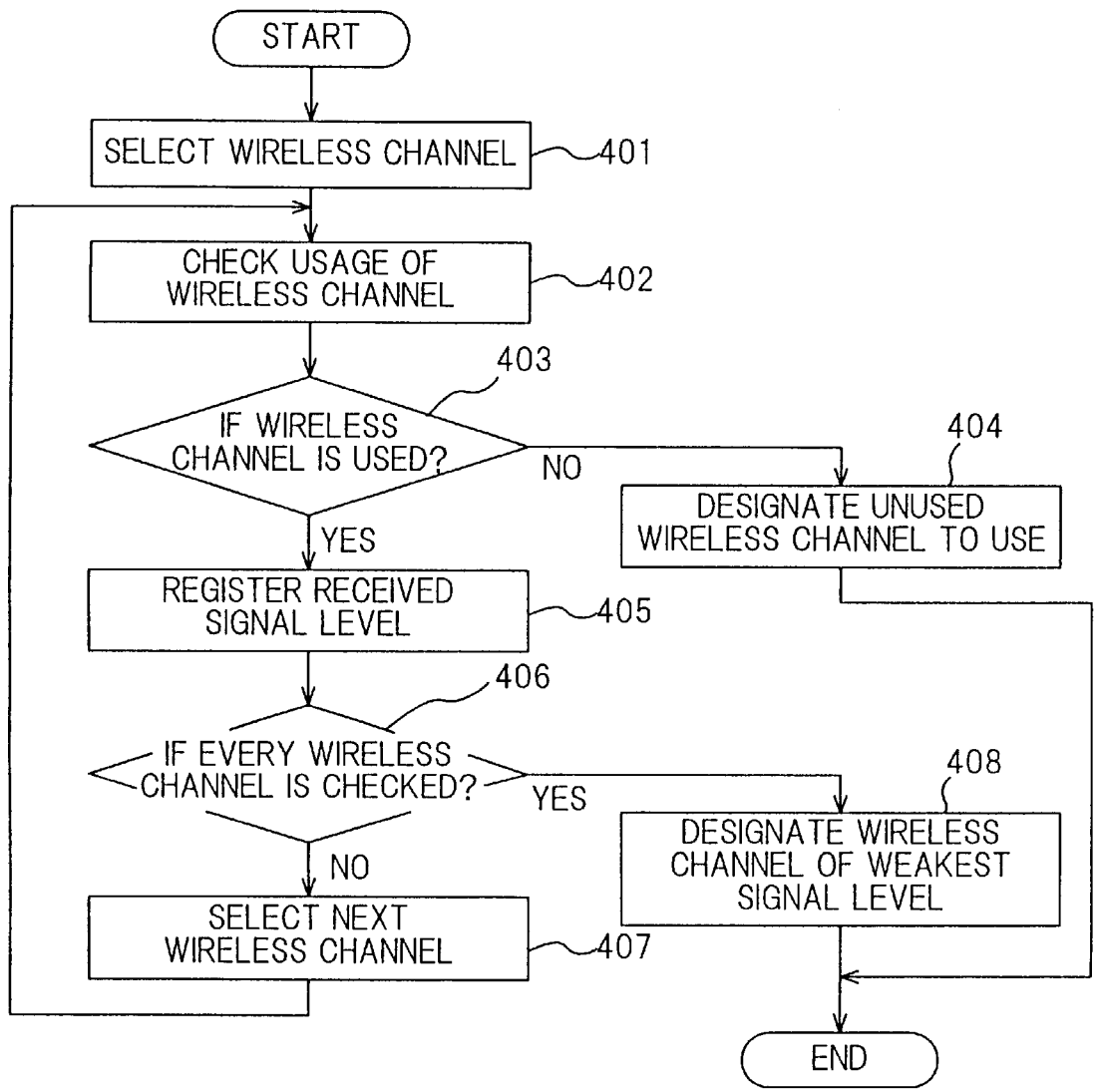
FIG. 4 is a flowchart illustrating another channel selection procedure according to a third embodiment of the invention.

Next, a third embodiment of the invention is described referring to a flowchart of FIG. 4 illustrating another channel selection procedure, wherein the designation of the shared wireless channel at step 207 of FIG. 2 is performed by selecting a used wireless channel according to received signal levels of the used wireless channels. In the flowchart of FIG. 4, a step 405 of registering the received signal level is inserted, for the purpose, after a wireless channel is found to be used at step 203 of FIG. 2, which is referred to at step 408 corresponding to step 207 of FIG. 2.

The channel selection section 1 selects a wireless channel from wireless channels to be checked (at step 401), and checks whether the concerning wireless channel is used or not (at step 402). When the concerning wireless channel is found not used by any other base station (NO at step 403), the concerning wireless channel is designated as the wireless channel to be used (at step 404) and the procedure goes to END.

When the concerning wireless channel is used by another base station (YES at step 403), the channel selection section 1 registers received signal level of the concerning wireless channel (at step 405) and selects a next wireless channel (at step 407) and the procedure returns to step 402 for checking whether the next wireless channel is used or not. Thus, steps 402 to 407 are repeated until an unused wireless channel is found (NO at step 403) or every of the wireless channels is checked (YES at step 406).

When every of the wireless channels is checked (YES at step 406), it means that no wireless channel is left unused. In the case, the channel selection section 1 designates a wireless channel which shows the weakest value of the received signal level among wireless channels used by other base stations as the wireless channel to be shared (at step 408), and the procedure is terminated.

Figure 5:
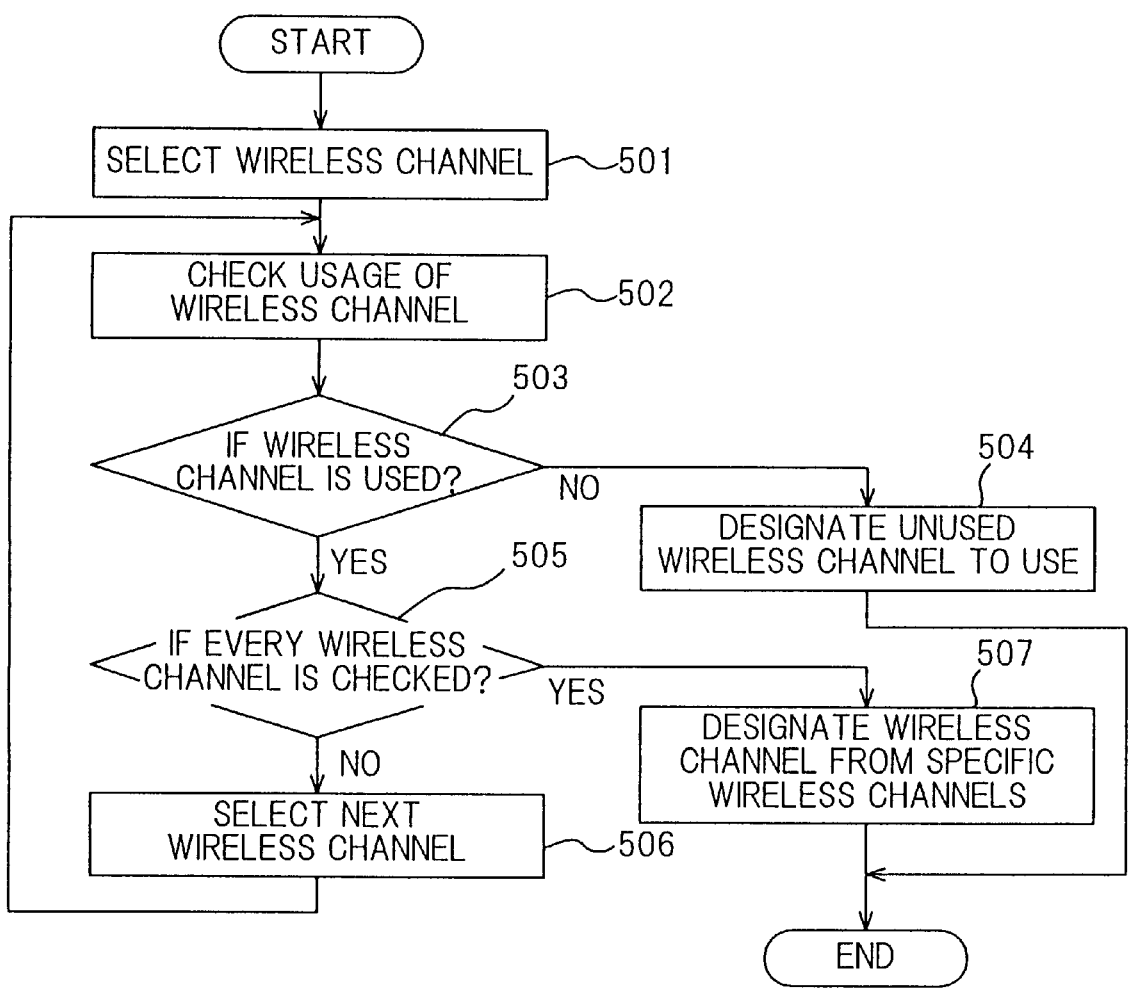
FIG. 5 is a flowchart illustrating still another channel selection procedure according to a fourth embodiment of the invention.

Next, a fourth embodiment of the invention is described referring to a flowchart of FIG. 5 illustrating still another channel selection procedure, wherein the designation of the shared wireless channel at step 207 of FIG. 2 is performed by selecting a used wireless channel from a certain number of specific wireless channels predetermined for the sharing. In the flowchart of FIG. 5, the same processes are performed with the flowchart of FIG. 2 except for step 207.

The channel selection section 1 selects a wireless channel from wireless channels to be checked (at step 501), and checks whether the concerning wireless channel is used or not (at step 502). When the concerning wireless channel is found not used by any other base station (NO at step 503), the concerning wireless channel is designated as the wireless channel to be used (at step 504) and the procedure goes to END.

When the concerning wireless channel is used by another base station (YES at step 503), the channel selection section 1 selects a next wireless channel (at step 506) and the procedure returns to step 502 for checking whether the next wireless channel is used or not. Thus, steps 502 to 506 are repeated until an unused wireless channel is found (NO at step 503) or every of the wireless channels is checked (YES at step 505).

When every of the wireless channels is checked (YES at step 505), it means that no wireless channel is left unused. In the case, the channel selection section 1 designates a wireless channel selected from the specific wireless channels predetermined for the sharing as the wireless channel to be shared (at step 507), and the procedure is terminated.

In the fourth embodiment, the channel selection at step 501 or at step 506 may be performed with a priority to the wireless channels other than the specific wireless channels for the first, leaving the specific wireless channels for the latter selections.

As heretofore described, the base station 10 of the wireless communication system of FIG. 1 can establish a new wireless link even when no wireless channel is left unused, by designating a wireless channel to be shared dynamically from wireless channels under use of other base stations, in an appropriate way in accordance with communication needs.

Figure 6:
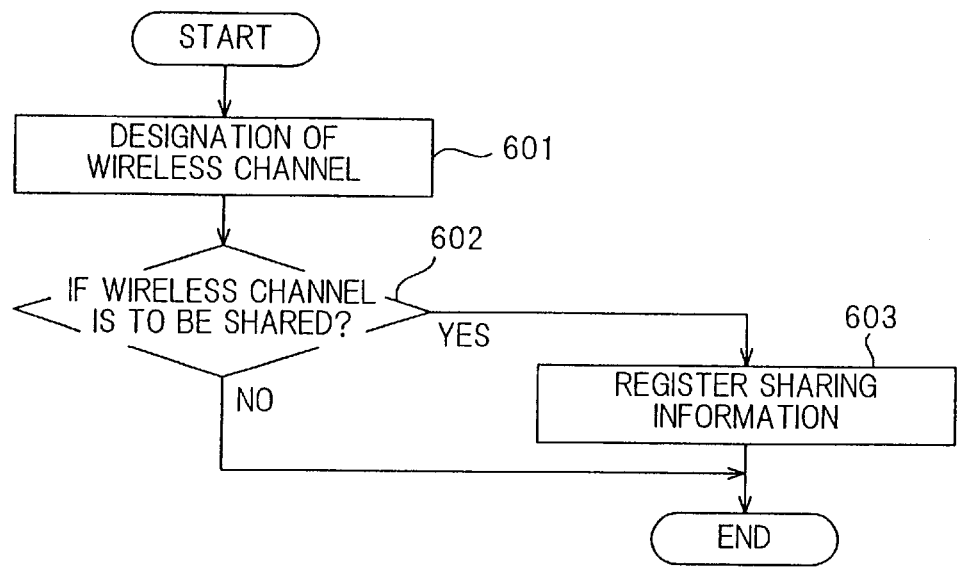
FIG. 6 is a flowchart illustrating a sharing information registration procedure according to a fifth embodiment of the invention.

Now, a fifth embodiment of the invention is described referring to a flowchart of FIG. 6 illustrating a sharing information registration procedure performed when a wireless channel is selected by the channel selection section 1, wherein sharing information of the wireless channel under use is registered in the sharing information register 2 of FIG. 1.

After designating a wireless channel to be used for a new wireless link (at step 601), the channel selection section 1 requests registration of sharing information of the designated wireless channel to the sharing information registration section 3 when the designated wireless channel is under use of another base station (YES at step 602), and the sharing information registration section 3 registers the sharing information in the sharing information register 2 (at step 603).

By thus registering the sharing information of the wireless channel actually using, the base station 10 is able to switch the using wireless channel into a wireless channel not used by other base stations, when there is any, at an appropriate timing referring to the sharing information register 2, as will be described afterwards.

In the fifth embodiment, the sharing information is registered in the sharing information register 2 of the base station 10 when the base station 10 decides to share a wireless channel actually used by another base station. However, it is preferable that the wireless channel which is under use of the base station 10 and decided to be shared by another base station may also be switched into an unused wireless channel, when there is any. For this purpose, the sharing information should be reported to the sharing base station to be registered also in the sharing information register 2 of the sharing base station.

Figure 7:
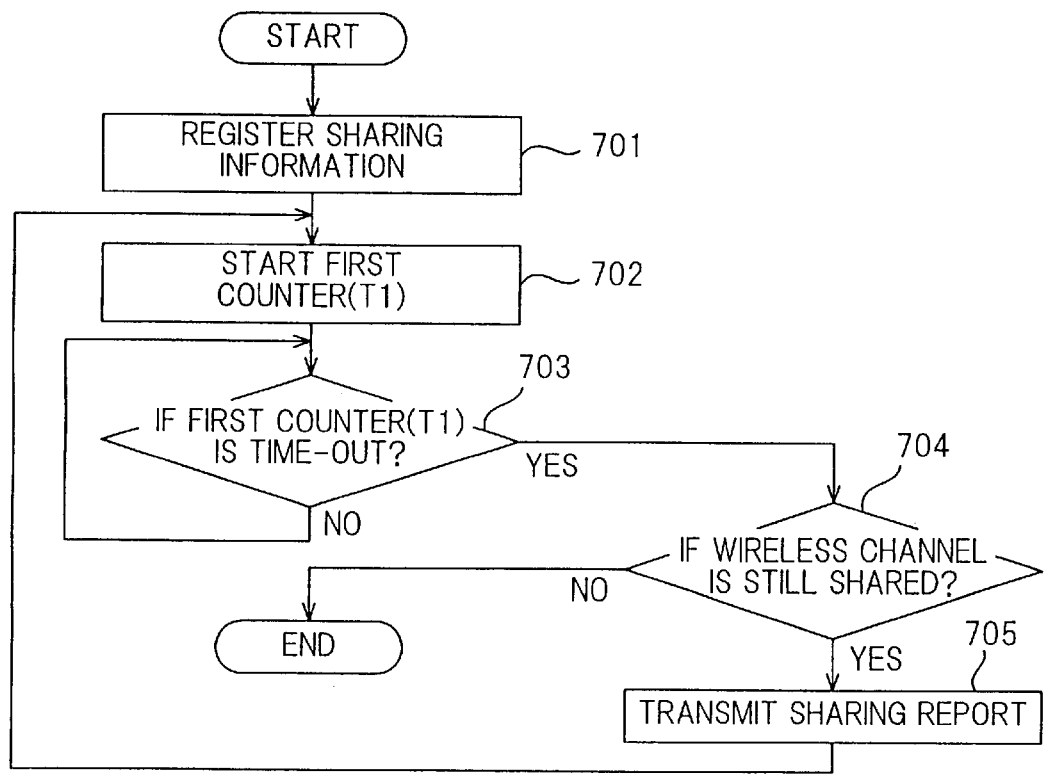
FIG. 7 is a flowchart illustrating a sharing information registration/reporting procedure according to a sixth embodiment of the invention.

Next, a sixth embodiment of the invention is described referring to a flowchart of FIG. 7 illustrating a sharing information registration/reporting procedure performed at step 603 of FIG. 6, wherein sharing information of the shared wireless channel is reported to the sharing base station periodically during the sharing information is registered.

The sharing information registration section 3 registers the sharing information (at step 701) according to the registration request received from the channel selection section 1 or the sharing information receiving section 7, as above described. Then, in the sixth embodiment, the sharing information registration section 3 starts the first counter of the sharing timer 4 (at step 702) at the same time, and waits the first counter counts the first time interval T1 (NO at step 703).

When the first counter of the sharing timer 4 counts the first time interval T1 (YES at step 703), the sharing timer 4 transmits a report indication to the sharing information reporting section 5 for indicating to transmit a sharing report to the sharing base station. The sharing information reporting section 5 refers to the sharing register 2 for confirming whether the using wireless channel is still under sharing or not.

When the using wireless channel is still shared (YES at step 704), the sharing information reporting section 5 transmits the sharing report to the sharing base station (at step 705) and the sharing timer 4 resets the first counter, returning to step 702. When sharing of the using wireless channel is found already released (NO at step 704), the sharing report transmission procedure of FIG. 7 is terminated, the first counter being left in a time-out status.

Thus, the sharing report concerning the shared wireless channel is transmitted periodically at intervals of T1 to the sharing base station. Information of the sharing report may be transmitted to the sharing base station making use of ordinary packets used for communication in the wireless link of the base station 10 included in header information thereof, for example.

Figure 8:
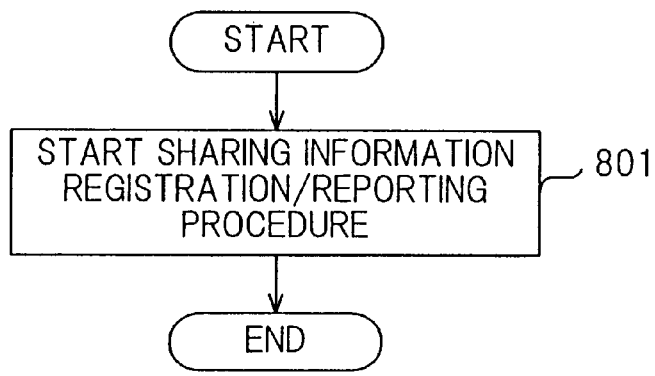
FIG. 8 is a flowchart illustrating a sharing report registration procedure according to a seventh embodiment of the invention.

Next, a seventh embodiment of the invention is described referring to a flowchart of FIG. 8 illustrating a sharing report registration procedure performed when a sharing report is received, wherein the sharing information notified by the sharing base station making use of the sharing report is also registered in the sharing information register 2.

When the sharing information receiving section 7 receives the sharing report from the sharing base station, the sharing information receiving section 7 requests registration of the sharing information in the sharing register 2 to the sharing information registration section 3, according to which the sharing information registration section 3 registers the sharing information and starts the first counter of the sharing timer 4 (at step 801) by starting the sharing information registration/reporting procedure of FIG. 7, for transmitting the sharing report periodically also from the base station 10 to the sharing base station.

Thus, the base station 10 and the sharing base station transmit the sharing report to each other, during the sharing information is registered in the sharing information register 2 of each thereof.

Figure 9:
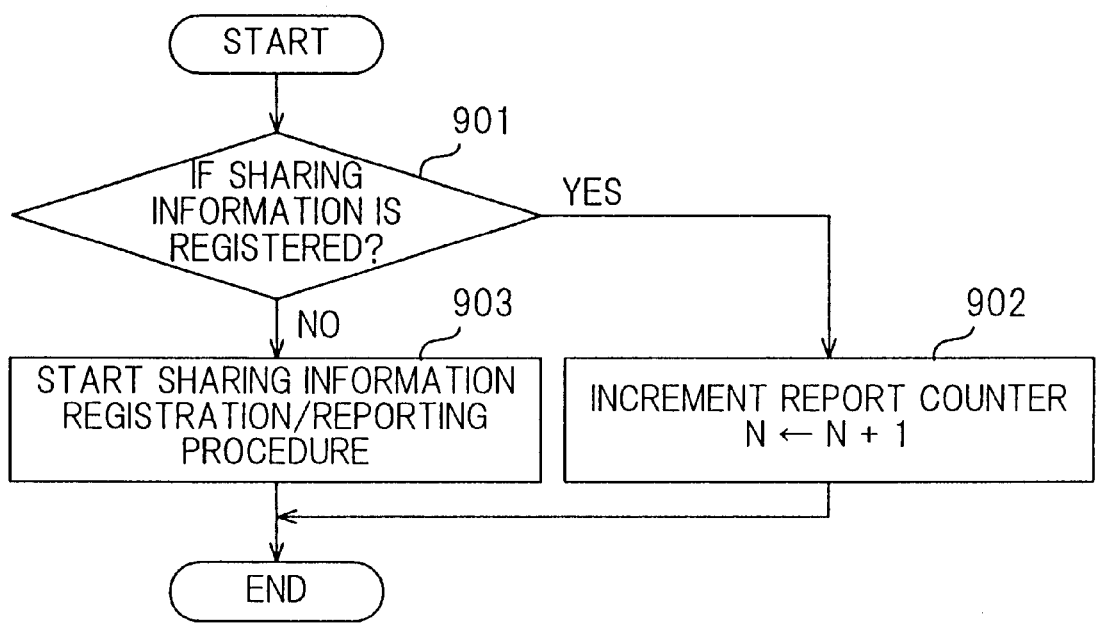
FIG. 9 is a flowchart illustrating another sharing report registration procedure according to an eighth embodiment of the invention.

Next, an eighth embodiment of the invention is described referring to flowchart of FIG. 9 illustrating another sharing report registration procedure performed when a sharing report is received, wherein a number of sharing reports received from the sharing base station is counted by the report counter provided in the sharing information registration section 3.

In the eighth embodiment, when the sharing information registration 3 is requested to register the sharing information, the sharing information registration section 3 checks whether the sharing information is already registered or not. When the sharing information is not registered (NO at step 901), the sharing information registration section 3 registers the sharing information in the sharing information register 2 and starts the first counter of the sharing timer 4 by starting the sharing information registration/reporting procedure of FIG. 7 (at step 903), while the sharing information registration section 3 only increments the report counter (at step 902), when the sharing information is already registered.

The report counter is referred to when clearing the sharing information as follows.

Figure 10:
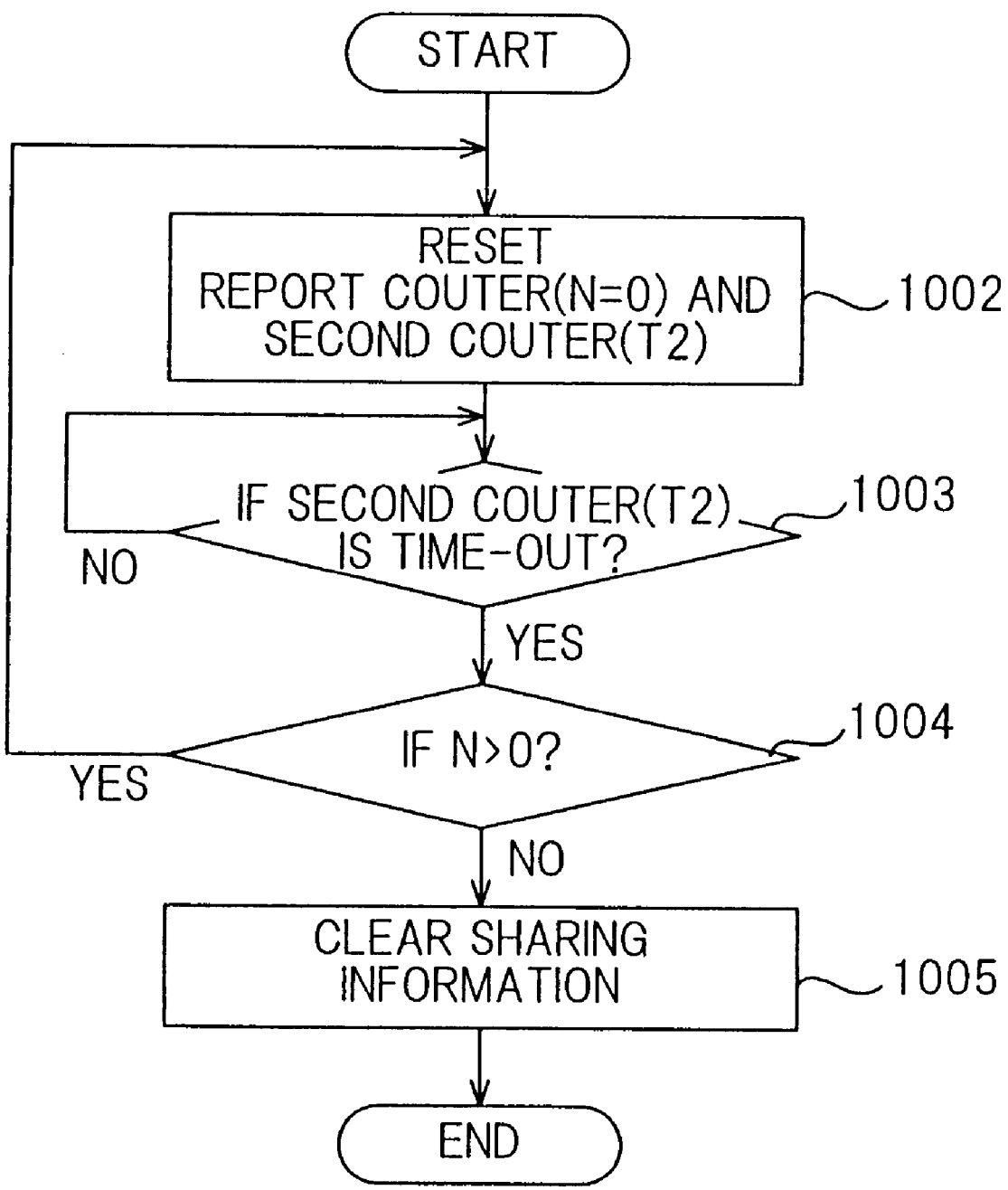
FIG. 10 is a flowchart illustrating a sharing information clearance procedure of the eighth embodiment.

FIG. 10 is a flowchart illustrating a sharing information clearance procedure of the eighth embodiment, which is started at step 603 of FIG. 6 and at step 903 of FIG. 9 together with the sharing information registration/reporting procedure of FIG. 7.

When the sharing information clearance procedure is started after the sharing information is registered, the report counter and the second counter of the sharing timer 4 are both reset to zero (at step 1002), and the sharing timer 4 waits the second counter counts the second time interval T2 (at step 10003). When the second counter counts the second time interval T2 (YES at step 1003), a clearance indication is transmitted from the sharing timer 4 to the sharing information registration section 3. Receiving the clearance indication, the sharing information registration section 3 refers to the report counter. When count value N of the report counter is found remaining to be zero (NO at step 1004), it means there is no sharing report received in the second time interval T2, and so, the sharing information registration section 3 clears the sharing information registered in the sharing information register 2 (at step 1005), considering that the sharing of the wireless channel under use is released.

When the count value N of the report counter is not zero (YES at step 1004), the sharing information clearance procedure returns to step 1002 and waits next second time interval T2, resetting the report counter and the second counter.

In the eighth embodiment, the report counter is described to be incremented when the sharing report is received. However, the second counter of the sharing timer 4 may be reset every time when the sharing report is received instead of incrementing the report counter.

Figure 11:
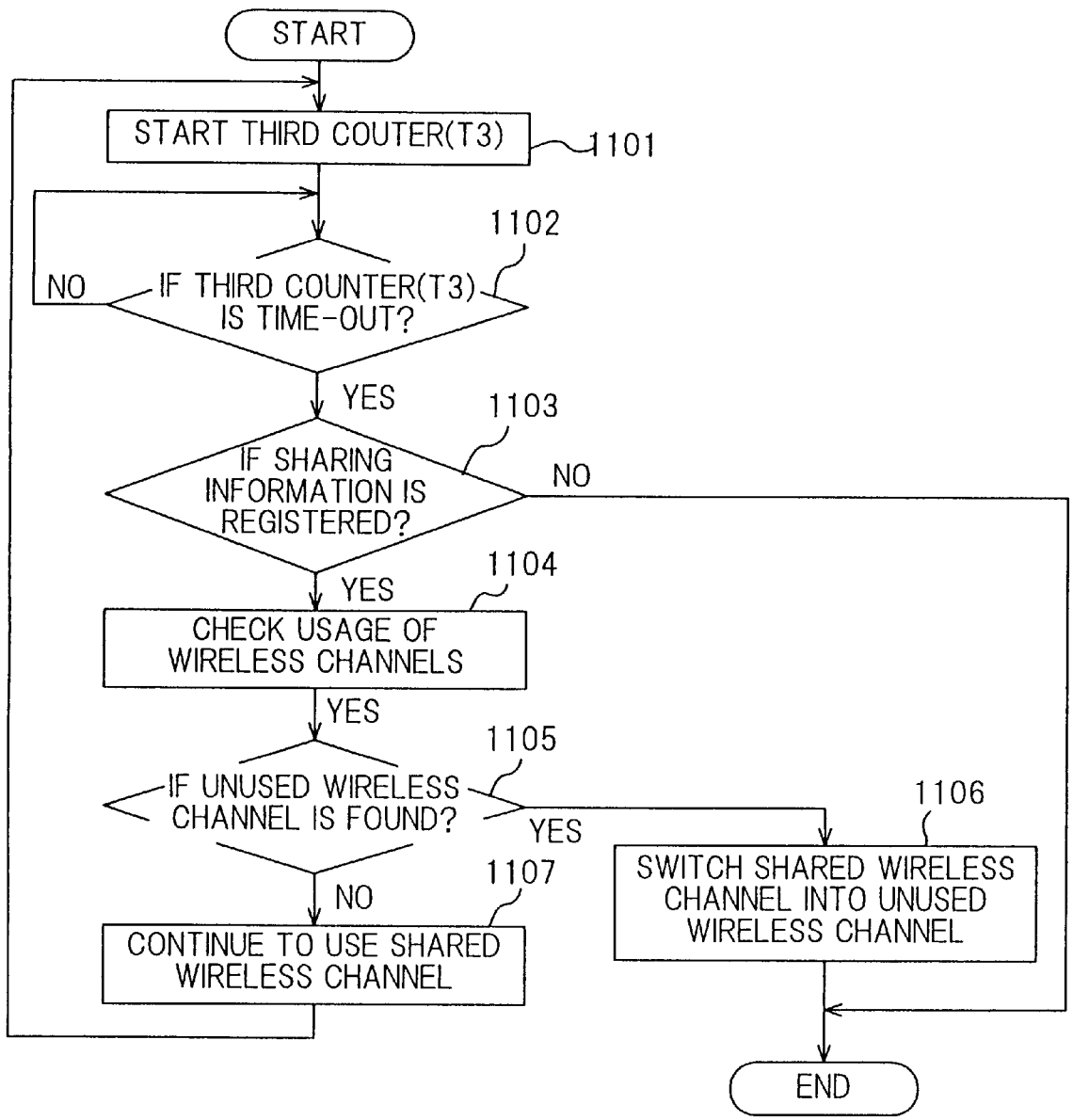
FIG. 11 is a flowchart illustrating a changeover procedure according to a ninth embodiment of the invention.

Now, a ninth embodiment of the invention is described referring to a flowchart of FIG. 11 illustrating a changeover procedure also started when the sharing information is registered together with the sharing information registration/reporting procedure of FIG. 7, at step 603 of FIG. 6 and step 903 of FIG. 9.

When the changeover procedure is started after the sharing information is registered, the third counter of the sharing timer 4 is started (at step 1101), and the sharing timer 4 waits the third counter counts the third time interval T3 (at step 1102). When the third counter counts the third time interval T3 (YES at step 1102), a changeover search indication is transmitted from the sharing timer 4 to the channel selection section 1. Receiving the changeover search indication, the channel selection section 1 refers to the sharing information register 2.

When the sharing information is already cleared (NO at step 1103), the channel selection section 1 terminates the changeover procedure, considering that the sharing of the wireless channel under use is already released.

When the sharing information is still registered (YES at step 1103), the channel selection section 1 searches an available wireless channel in the same way as performed when a new wireless link is to be established (at step 1104) according to steps 201 to 206 of FIG. 2, for example.

When an unused wireless channel is found (YES at step 1105), the channel selection section 1 switches the shared wireless channel to the unused wireless channel and the sharing registration section 3 clears the sharing information registered in the sharing information register 2 (at step 1106).

When no unused wireless channel is found (NO at step 1105), the channel selection section decides to continue to use the wireless channel actually shared (at step 1107) and waits the next third time interval T3, re-starting the third counter.

The channel selection section 1 may designate another wireless channel according to one of the flowcharts of FIGS. 3 to 5, instead of deciding to continue to use the wireless channel actually shared.

Figure 12:
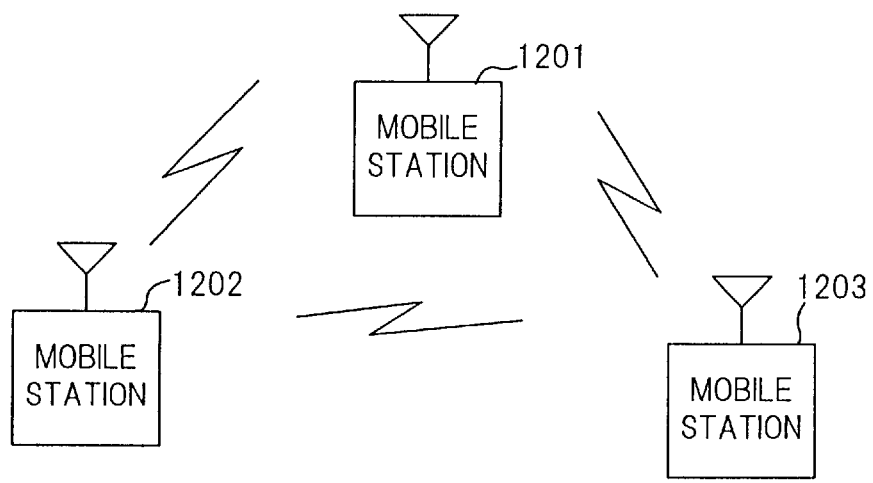
FIG. 12 is a schematic diagram illustrating an example of a network configuration of the wireless communication system.

Heretofore, the embodiments of the invention are described to be applied to a base station of a wireless communication system for establishing a wireless communication between one or more mobile stations sharing a wireless channel with another base station. However, the scope of the invention is not limited in the embodiments. For example, as illustrated in FIG. 12, the channel selection method of the invention may be applied to one (1201) of mobile stations (1201 to 1203) of the wireless communication system for establishing a new wireless link with one or more of the other mobile stations (1202 and 1203), or, as illustrated in FIG. 13, the wireless channel under use for a wireless link closed among mobile stations (1307 to 1309) may be designated as the wireless channel to be shared.

As heretofore described, a wireless station of a wireless communication system can establish a new wireless link even when no wireless channel is left unused, by applying the channel selection method according to the first embodiment of the invention, by designating a wireless channel to be shared dynamically from wireless channels under use of other base stations, enabling at the same time to improve efficiency of channel resources of the wireless communication system.

Furthermore, influence of the shared wireless channels may be divided fairly among all the wireless channels according to the second embodiment by selecting the shared wireless channel at random, may be minimized according to the third embodiment by selecting a wireless channel showing the weakest receiving signal level as the shared wireless channel, or may be limited in specific wireless channels according to the fourth embodiment by selecting the shared wireless channel from the specific wireless channels predetermined for the sharing.

Furthermore, the shared wireless channel may be switched into unused wireless channels at an appropriate timing when there is any unused wireless channel according to the fifth embodiment by registering the sharing information.

Furthermore, the wireless station can be reported when another wireless station has begun to share the wireless channel under use of the wireless station according to the sixth embodiment by the sharing report transmitted from the sharing wireless station, and both the wireless station and the sharing wireless station can always confirm sharing status of their using wireless channel according to the seventh embodiment by exchanging the sharing report with each other periodically.

Furthermore, the wireless station can recognize release of the sharing status for clearing the sharing information according to the eighth embodiment by counting a number of the sharing reports received in a certain time interval.

Still further, the wireless station can switch the shared wireless channel into an unused wireless channel according to the ninth embodiment by searching the unused wireless channel periodically during the sharing information is registered.

What is claimed is:

1. A channel selection method of a wireless communication system to be applied to a wireless station for establishing a wireless link of the wireless communication system by dynamically selecting a wireless channel to be used for the wireless link from a plurality of wireless channels prepared for the wireless communication system; said channel selection method comprising:

a channel search step of checking whether any one of the plurality of wireless channels is left unused by other wireless stations of the wireless communication system or not;

a sharing channel selection step of selecting a wireless channel to be shared from wireless channels under use of the other wireless stations, said sharing channel selection step being performed when every of the plurality of wireless channels is found to be under use of one of the other wireless stations at the channel search step; and a link establishment step of establishing the wireless link by sharing the wireless channel selected at the sharing channel selection step.

2. A channel selection method as recited in claim 1; wherein said sharing channel selection step is performed by selecting the wireless channel to be shared at random from the wireless channels under use of the other wireless stations.

3. A channel selection method as recited in claim 1; wherein:

said channel search step is performed by checking a received signal level of every of the wireless channels under use of the other wireless stations; and said sharing channel selection step is performed by selecting a wireless channel whereof the received signal level is minimum among the wireless channels under use of the other wireless stations as the wireless channel to be shared.

4. A channel selection method as recited in claim 1; wherein said sharing channel selection step is performed by selecting the wireless channel to be shared from specific wireless channels predetermined to be shared commonly for every wireless station of the wireless communication system.

5. A channel selection method as recited in claim 1; wherein said link establishment step comprising a step of registering sharing information of the wireless channel to be shared in a sharing information register provided in the wireless station.

6. A channel selection method as recited in claim 5; wherein the wireless station reports the sharing information to a sharing wireless station which is using the same wireless channel whereof the sharing information is registered in the sharing information register of the wireless station by way of the same wireless channel, periodically during the sharing information is registered.

7. A channel selection method as recited in claim 6; wherein the wireless station also registers the sharing information in the sharing information register thereof when the sharing information is reported from another wireless station of the wireless communication system.

8. A channel selection method as recited in claim 6; wherein the wireless station clears the sharing information registered in the sharing information register thereof when the sharing report is not received from any other wireless station of the wireless communication system during a predetermined time period.

9. A channel selection method as recited in claim 7; wherein the wireless station clears the sharing information registered in the sharing information register thereof when the sharing report is not received from any another wireless station of the wireless communication system during a predetermined time period.

10. A channel selection method as recited in claim 1; wherein the wireless station switches the wireless channel used for the wireless link into an unused one of the wireless channels when the unused one is found by performing the channel search step periodically.

11. A channel selection method as recited in claim 8; wherein the wireless station switches the wireless channel used for the wireless link into an unused one of the wireless channels when the unused one is found by performing the channel search step periodically during the sharing information is registered in the sharing information register thereof.

12. A channel selection method as recited in claim 9; wherein the wireless station switches the wireless channel used for the wireless link into an unused one of the plurality of wireless channels when the unused one is found by performing the channel search step periodically during the sharing information is registered in the sharing information register thereof.

13. A wireless station of a wireless communication system for establishing a wireless link of the wireless communication system by dynamically selecting a wireless channel to be used for the wireless link from a plurality of wireless channels prepared for the wireless communication system; said wireless station comprising:

a channel selection section for checking whether any one of the plurality of wireless channels is left unused by other wireless stations of the wireless communication system or not, and selecting a wireless channel to be shared from wireless channels under use of the other wireless stations when every of the plurality of wireless channels is found to be under use of any of the other wireless stations;

a sharing information register wherein sharing information is registered during the wireless station shares a wireless channel with one of the other wireless stations;

a sharing timer for counting a first and a second time interval;

a sharing information reporting section for transmitting a sharing report concerning a wireless channel under use of the wireless station to said one of the other wireless stations every time when the sharing timer counts the first time interval on condition the sharing information is registered in the sharing information register; and a sharing information registration section for registering the sharing information in the sharing information register and starting the sharing timer when the wireless channel selected by the channel selection section to be shared is used for establishing the wireless link and when a sharing report concerning the wireless channel under use of the wireless station is received from any of the other wireless stations, and clearing the sharing information when no sharing report concerning the wireless channel under use of the wireless station is received from any of the other wireless stations during a period necessary for the sharing timer to count the second time interval.

14. A wireless station as recited in claim 13; wherein:

said sharing timer further counts a third time interval; and said channel selection section switches the wireless channel under use of the wireless station into an unused one of the plurality of wireless channels when the unused one is found, by checking whether any one of the plurality of wireless channels is left unused by other wireless stations of the wireless communication system or not, every time when the sharing timer counts the third time interval, on condition the sharing information is registered in the sharing information register.

15. A channel selection method as recited in claim 1; wherein said wireless station for establishing a wireless link is one of a base station of the wireless communication system connected to a wired network.

16. A wireless station as recited in claim 13; said wireless station being one of a base station of the wireless communication system connected to a wired network.

17. A channel selection method as recited in claim 1; wherein said wireless station for establishing a wireless link is one of at least two mobile stations of the wireless communication system, the wireless link being established among said at least two mobile stations.

18. A wireless station as recited in claim 13; said wireless station being one of at least two mobile stations of the wireless communication system, and the wireless link being established among said at least two mobile stations.

* * * * *

UNITED STATES PATENT AND TRADEMARK OFFICE
CERTIFICATE OF CORRECTION

PATENT NO. : 6,175,739 B1
DATED : January 16, 2001
INVENTOR(S) : Kenichi Ishii et al.

It is certified that error appears in the above-identified patent and that said Letters Patent is hereby corrected as shown below:

<u>Title page,</u>
Item "(30) Foreign Application priority data", change "Jul. 10, 1997" to -- Jul. 30, 1997 --.

Signed and Sealed this

Twenty-fifth Day of September, 2001

Attest:

*Nicholas P. Godici*

NICHOLAS P. GODICI
*Acting Director of the United States Patent and Trademark Office*

*Attesting Officer*